United States Patent [19]

Jones et al.

[11] 4,187,256

[45] Feb. 5, 1980

[54] POLYALKYLENIMINE-ALKYLENE SULFIDE GRAFT COPOLYMER AND METHOD OF MAKING SAME

[75] Inventors: Giffin D. Jones; Robert G. Asperger, both of Midland, Mich.

[73] Assignee: The Dow Chemical Company, Midland, Mich.

[21] Appl. No.: 948,464

[22] Filed: Oct. 4, 1978

[51] Int. Cl.$^2$ .................... C08L 61/20; C08L 79/04; C08L 81/04
[52] U.S. Cl. .................................. 525/471; 528/226; 528/228; 528/229; 528/377; 528/424
[58] Field of Search ............... 260/823; 528/221, 226, 528/228, 229

[56] References Cited

U.S. PATENT DOCUMENTS

| | | | |
|---|---|---|---|
| 3,346,527 | 10/1967 | Lagally | 260/823 X |
| 3,375,231 | 3/1968 | Fukui et al. | 260/823 |
| 3,413,272 | 11/1968 | Rees | 260/823 X |
| 3,548,002 | 12/1970 | Levine | 260/823 X |
| 3,640,909 | 2/1972 | Jones et al. | 528/226 |

*Primary Examiner*—Wilbert J. Briggs, Sr.
*Assistant Examiner*—John Wilson Jones

[57] ABSTRACT

A graft copolymer of an episulfide and the reaction product of a polyalkylenimine and a lower ketone is water-soluble or water-dispersible. The copolymer is made by adding an episulfide to the polyalkylenimine dissolved in a lower ketone and heating below the boiling point of the solvent. The resulting graft copolymer is a corrosion inhibitor.

9 Claims, No Drawings

POLYALKYLENIMINE-ALKYLENE SULFIDE GRAFT COPOLYMER AND METHOD OF MAKING SAME

BACKGROUND OF THE INVENTION

Graft copolymers made by reacting a dry, liquid polyethylenimine and propylene sulfide at 30° C.-40° C., using from 0.2 to 4 moles of propylene sulfide per repeating ethylenimine unit in the polyamine, are disclosed in Journal of Polymer Science (Polymer Chemistry Edition) 10, 3519-3258 (1972). The resulting graft copolymers have a high mercaptan functionality resulting from graft initiation on various sites of the polyamine. Separation of the graft copolymer from propylene sulfide homopolymer could not be effected because of extremely rapid oxidative cross-linking of the product in air. Cross-linking of the polymers render them insoluble in aqueous systems and therefore their use as aqueous corrosion inhibitors becomes impractical where small amounts of oxygen are present. Storage of such a product requires elaborate care to avoid excessive exposure to air or other oxygen-containing atmosphere.

SUMMARY OF THE INVENTION

The invention provides novel graft copolymers of ethylene sulfide with an adduct of a lower aliphatic ketone and a polyamine wherein said polyamine may be a poly(alkylenimine) or a polyalkylene polyamine as hereinafter defined. These graft copolymers and the related graft copolymers obtained therefrom by acid hydrolysis are soluble or readily dispersible in aqueous media such as aqueous alkanolamine solutions. The graft copolymers and said hydrolysis products therefrom are useful as corrosion inhibitors. Certain of said copolymers are fiber-forming and others form resinous films and can be employed, for example, in coating compositions for metals.

The graft copolymers of this invention are particularly suitable as corrosion inhibitors for systems in which sour gas, containing $CO_2$ and $H_2S$, is absorbed with an aqueous alkanolamine solution alone or in admixture with a physical absorbent such as sulfolane, N-alkyl-pyrrolidones, N-alkyl-morpholinones or oxazolidinones. The effective amounts of the graft copolymers for mitigating corrosion of iron-containing equipment ranges from about 10 to about 2,000 parts by weight per million parts of alkanolamine solution, depending in part on the amounts of $CO_2$ and $H_2S$ in the gas undergoing treatment, in part on the specific absorbent used, in part on the temperatures employed and in part on the geometry of the equipment. In addition to their corrosion-inhibitor properties the new graft copolymers have been found to have antifouling properties which extend filter life in sour-gas treating systems.

DETAILED DESCRIPTION OF THE INVENTION

Poly(alkylenimines) which can be employed in this invention are well-known. They are prepared by polymerizing one or a mixture of lower alkylenimines conforming to the general structure

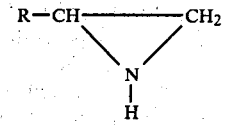

wherein R may be hydrogen, methyl or ethyl and is preferably hydrogen.

The preferred poly(alkylenimines) are poly(ethylenimines) of molecular weight from about 300 to about 10,000 and most preferred are those having average molecular weights of from about 1,000 to about 7,000.

In addition to the foregoing, other polyamines can be employed instead of a polyalkylenimine as starting materials in preparing the compositions of the invention. Such polyamines include acid-hydrolyzed poly(ethyloxazolidine) and polyalkylene polyamines of suitable molecular weight. For example, polyethylene polyamines, commercially available as products of reaction of ammonia with 1,2-dichloroethane, may be employed provided said polyamine has an average molecular weight of at least about 250 and preferably of over 300. Alternatively, polypropylene polyamines prepared from ammonia and 1,2-dichloropropane may be employed. Suitable polyamines may be prepared from poly(ethyloxazolidine) by heating the latter with an excess of aqueous hydrochloric acid for a period of time to open the oxazolidine rings. The resulting product is freed of acid and converted to the free amine form by passage through an anion-exchange resin in the basic form.

The aliphatic ketone can have from 3 to about 6 carbon atoms. Preferably, the ketone contains at least one methyl group and most preferably the ketone is acetone. Other ketones which are operable include methyl ethyl ketone, methyl propyl ketone, methyl isopropyl ketone, methyl butyl ketone and methyl isobutyl ketone. The methyl butyl and methyl isobutyl ketones are less satisfactory than the lower molecular weight ketones mentioned above.

The amount of ketone is not particularly critical. Usually, however, a sufficient amount to dissolve the poly(alkylenimine) is used. Frequently it is found that the poly(alkylenimine) is not readily soluble in anhydrous ketone and it is necessary to add a small amount of water with the ketone to act as a cosolvent. In general it is desirable to add only the minimum amount of water necessary to obtain the desired solution.

The time required for the ketone to react with the poly(alkylenimine) depends in part on temperature and in part on the molar ratio of the reactants. At reflux temperature with sufficient ketone to dissolve the polyamine, about ½ to ¾ hour is adequate. At room temperature allowing the reaction mixture to stand overnight is usually adequate.

NMR spectra on the reaction product indicates that residues derived from the ketone are present on the poly(alkylenimine)-ketone adduct.

The ethylene sulfide (episulfide) which is reacted with the ketone derivative of the poly(alkylenimine) is a known material having the formula

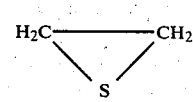

Useful graft copolymers have been obtained when employing from about 0.5 to about 1.5 parts by weight of episulfide per part by weight of poly(alkylenimine) in the reaction mixture. Most preferred is to employ one part of episulfide per part of poly(alkylenimine).

In running this phase of the overall reaction, the ethylene sulfide is preferably added slowly with mixing either in small aliquots or in a small stream to a solution of the ketone-poly(alkylenimine) reaction product, and maintaining a temperature of from about 30° C. to about 60° C. during the reaction period, although higher temperatures have been used satisfactorily. The reaction is exothermic and, therefore, external cooling may be required to keep the temperature within the desired range.

Pressure does not appear to have any effect on the reaction. However, because of the disagreeable odor of the episulfide it is preferred to run the reaction in an enclosed system.

The graft copolymer product prepared in accordance with the above is usually obtained in the form of a solution or gel in the reaction solvent. Such a solution or gel may be added directly to an aqueous alkanolamine solution in an amount to provide from about 10 to about 1,000 parts of the graft copolymer per million parts of alkanolamine solution to serve as an iron-corrosion inhibitor when said alkanolamine solution is employed for absorbing acid gases. However, the acetone addition-product form of the graft copolymer tends to cross-link and become insoluble on standing. Thus, for most purposes, it is desirable to convert the initial graft copolymer product into a more stable, soluble graft copolymer by heating the initial product with an acidified aqueous solution at a temperature above the boiling point of the ketone employed whereby the amine-ketone addition is reversed and the ketone is distilled away from the product.

The examples which follow are intended to illustrate but not to limit the invention. All parts and percentages are given by weight, unless otherwise specifically indicated.

EXAMPLE 1

A mixture of 75 weight parts of acetone, 10 weight parts of water and 14.5 weight parts of a poly(ethylenimine), M.W. about 600, was prepared and allowed to stand at room temperature over a weekend. Thereafter the mixture was heated to 45° C. with agitation and 15.3 weight parts of ethylene sulfide were added in two separate aliquots, over a period of 2 hours. After each addition, an exotherm of about 5° C. was observed. Agitation was continued for two hours after completing the addition of the ethylene sulfide. The mixture was cooled to 25° C. and stirred overnight. No solids were formed. Upon evaporation of the acetone, the residue was a gel, which was readily soluble in water.

At a concentration of 100 ppm in 15 weight percent aqueous ethanolamine, this product gave 70 percent protection against iron corrosion in a $CO_2$ absorption system.

EXAMPLE 2

A mixture of 10 weight parts water, 75 weight parts acetone and 12 weight parts of poly(ethylenimine), M.W. about 600, was heated to 45° C. in a water jacketed vessel, and agitated. Then 15.73 weight parts of ethylene sulfide were added in 2½ hours using a Milton Roy pump. The exotherm was 6° C. The stirring was continued overnight at 32° C. The mixture contained about 33 percent crude insoluble copolymer solids and about 67 percent soluble graft copolymer. This example is intended to show that permitting the reaction between the ketone and the poly(alkylenimine) to proceed for a period of time as in Example 1 before adding the monomeric alkylene sulfide is desirable to increase the yield of soluble graft copolymer.

EXAMPLE 3

A batch of graft copolymer was prepared by the procedure of Example 1 and heated to evaporate off excess unreacted acetone. Eleven gallons of the resulting viscous gel was stored in inert containers. On standing the gel set to a brown rubbery solid. The latter was cut into chunks of about 200 grams each and placed together with 20 quarts of hot water into a 20-gallon stainless steel, open-top reactor equipped with a steam coil and an electrically driven stirrer. On heating with stirring the chunks broke up and dissolved. Frothing was controlled by addition of one pint of a liquid silicone antifoam agent (Dow Corning Antifoam DC-10). Thereafter while heating and stirring was continued, 45 pounds of acetic acid was added to the reactor gradually over a period of two hours to acidify the mixture to a pH of between 4 and 5 to foster hydrolysis of the acetone moieties from the polymer-adduct. The acetone produced by hydrolysis of the adduct was evaporated from the reaction mixture as formed. On completion of the hydrolysis the acid was neutralized and the reaction product mixture was brought to pH 8 by addition of seven gallons of aqueous 32 percent by weight sodium hydroxide solution. It was found that when a sample of the hot reaction product was cooled to room temperature it set to a semisolid form. Dilution of the reaction product with 1.5 parts by volume of water per part by volume of reaction product gave a solution of the polyethylenimine-ethylene sulfide graft copolymer which was a slightly viscous liquid at room temperature.

When portions of the above reaction product are employed in aqueous 12–15 percent by weight monoethanolamine solution in tests in a commercial scrubber operated to remove corrosive acid gases such as carbon dioxide and hydrogen sulfide from natural gas, good corrosion inhibition is obtained using from 100 to 500 parts by weight of the graft copolymer per million parts by weight of ethanolamine solution. In addition to corrosion inhibition the graft copolymer shows excellent antifouling properties as evidenced by a decrease in the rate of build-up of pressure drop across the heat exchangers and by an increase in filter life from a base period of 5 to 8 hours using prior commercial corrosion inhibitors to periods of from 20 to 40 hours using the graft copolymer.

EXAMPLE 4

A solution of 51.15 parts poly(ethylenimine), M.W. about 600, in 390 ml methyl isobutyl ketone and 100 ml methanol was prepared. To 107.4 weight parts of this solution, preheated to 45° C., were added 14.25 weight parts of ethylene sulfide over a ½-hour period. Warming was continued for 2 hours to complete the grafting reaction. No precipitate was formed.

EXAMPLE 5

A solution of 34.1 weight parts of poly(ethylenimine), M.W. about 600, in 260 ml acetone was allowed to stand four days at room temperature. To 84.3 weight parts of this solution were added 12.64 weight parts of ethylene sulfide over a 30-minute period at 45° C., with stirring. Warming was continued for 20 hours. No precipitate formed and it did not gel on standing overnight.

EXAMPLE 6

The procedure of Example 5 was repeated with the exception that only half as much ethylene sulfide was added. No precipitate formed and no gel developed on standing overnight.

EXAMPLE 7

A solution was prepared of 740 ml acetone and 94.4 weight parts of a polyalkylene polyamine mixture containing 8-9 percent tetraethylene pentamine and isomers thereof, 30-36 percent pentaethylene hexamine and isomers thereof, and the remainder higher homologs. A 167 weight part portion of the solution was stirred under reflux in a 55° C. bath for 2 hours while 19.88 weight parts of ethylene sulfide were added. Warming was continued overnight. A small amount of precipitate formed. The solids content of the solution was 26 percent.

A series of tests was made for corrosion inhibition properties of the products described above. In each case an iron coupon was submerged in a 15 percent ethanolamine (MEA) solution saturated with $CO_2$ at room temperature and the solution heated to 135° C. under a pressure of 40 psig for 16 hours, using 100 ppm of the graft copolymer. Tabulated below are the data taken during these tests.

| Product of Examples | Percent Corrosion Inhibition |
|---|---|
| 4 | 52-58 |
| 5 | 41-47 |
| 6 | 44-47 |
| 7 | 38-40 |

Tests run on the product obtained when acetone was reacted with poly(ethylenimine), M.W. about 600, for two days and then evaporated, showed the presence of dimethylimidazolidine rings

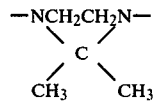

and ketimine groups

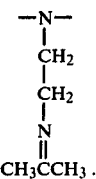

On long standing in acetone, the reaction product gels by the formation of isopropylidene diamine cross-links.

An unusual feature of this invention is the formation of water-soluble graft copolymers of the type described, in view of the fact that when a low molecular weight alkylene sulfide, such as ethylene sulfide or propylene sulfide, is added to poly(ethylenimine) which had not been reacted with a ketone, a white precipitate forms. This precipitate is not water-soluble.

We claim:

1. A graft copolymer consisting essentially of (1) a reaction product of a lower aliphatic ketone and a poly-(alkylenimine), said polyalkylenimine having a molecular weight of from about 300 to about 10,000, and (2) ethylene sulfide in a weight ratio of 1 of (1) to 0.5 to 1.5 of (2).

2. The graft copolymer of claim 1 in which the poly(ethylenimine) has a molecular weight of from about 300 to about 1,000.

3. The graft copolymer of claim 2 in which the poly(ethylenimine) has a molecular weight of about 450-600 and the ketone with which it is reacted is acetone.

4. The graft copolymer of claim 2 in which the weight ratio of poly(ethylenimine) to ethylene sulfide is about 1 to 1.

5. The method of preparing a water-soluble graft copolymer comprising reacting a reaction product of poly(alkylenimine) and a liquid low molecular weight nonaromatic ketone with ethylene sulfide at a temperature of from about 25° C. to about 75° C.

6. The method of claim 5 in which the poly(ethylenimine) is reacted with acetone before reaction with ethylene sulfide.

7. The method of claim 6 in which the weight ratio of poly(ethylenimine) to ethylene sulfide is about 1 to 1.

8. The method of inhibiting corrosion of ferrous metals by aqueous alkanolamine solutions which comprises incorporating in said solutions from about 10 to about 1,000 parts by weight of a polyethylenimine-ethylene sulfide copolymer per million parts of alkanolamine solution.

9. The method of claim 8 wherein the alkanolamine is monoethanolamine.

* * * * *